Jan. 30, 1951      H. T. HACKER      2,539,831
GAUGE FOR SETTING CUTTER HEAD KNIVES

Filed Dec. 15, 1945      2 Sheets—Sheet 1

Inventor

Henry T. Hacker,

By Clarence A. O'Brien
and Harvey B. Jacobson
Attorneys

Jan. 30, 1951      H. T. HACKER      2,539,831
GAUGE FOR SETTING CUTTER HEAD KNIVES
Filed Dec. 15, 1945      2 Sheets-Sheet 2
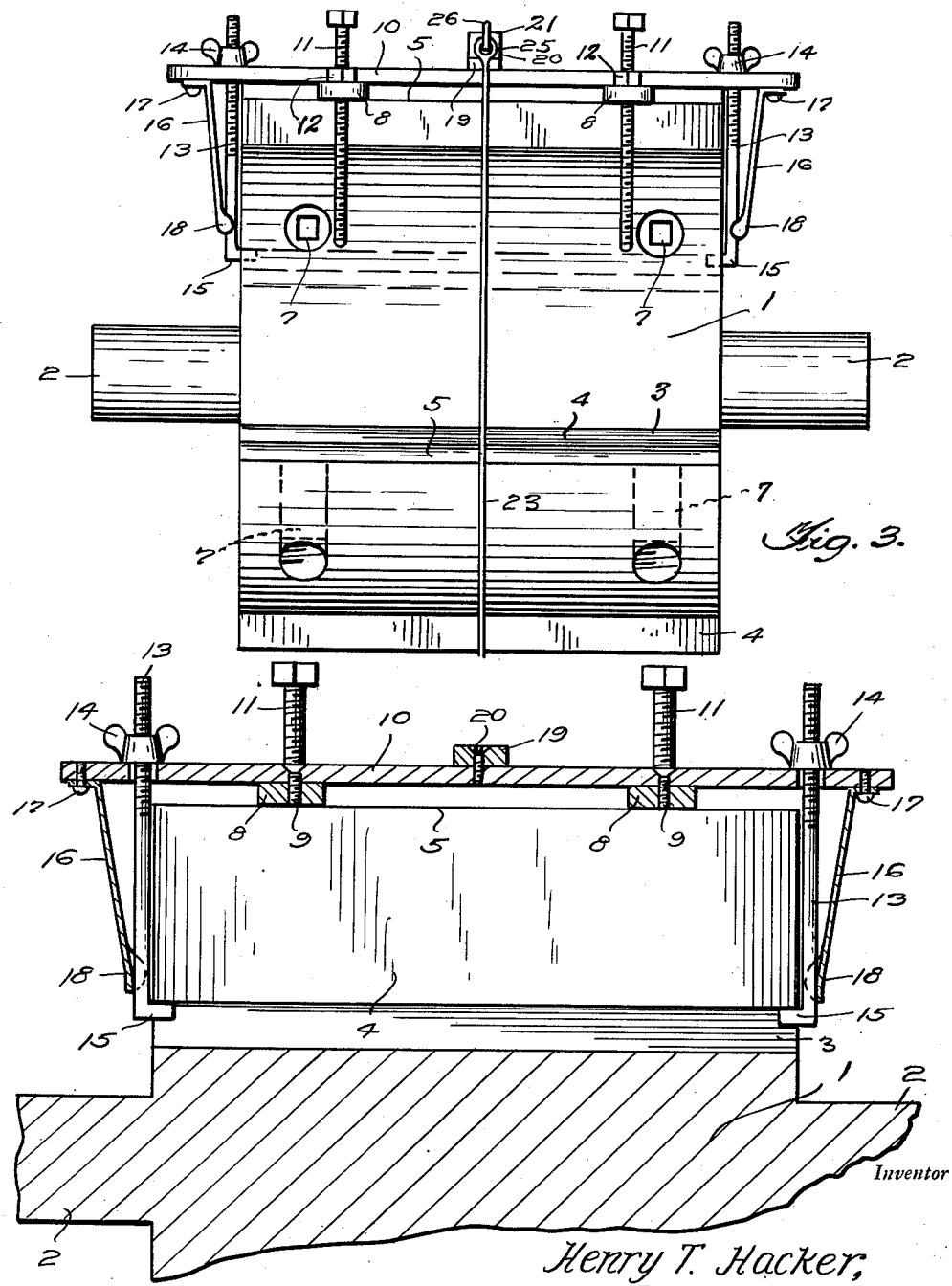

Patented Jan. 30, 1951

2,539,831

UNITED STATES PATENT OFFICE 2,539,831

GAUGE FOR SETTING CUTTERHEAD KNIVES

Henry T. Hacker, Penn Yan, N. Y.

Application December 15, 1945, Serial No. 635,358

1 Claim. (Cl. 29—256)

My invention relates to improvements in gages for setting the knives of rotary cutting heads of woodworking machines, the primary object in view being to provide a simple form of labor-saving gage adapted for application to cylindrical cutting heads and for operation to accurately set the usual outwardly slidable knives of said heads so as to project from the heads uniformly, relatively, and throughout the length of the knives, all without the exercise of special skill in applying and operating the gage.

Other and subordinate objects, also comprehended by my invention, together with the precise nature of my improvements and the manifold advantages thereof, will be readily understood when the succeeding description and claim are read with reference to the drawings accompanying and forming part of this specification.

In said drawings—

Figure 1:
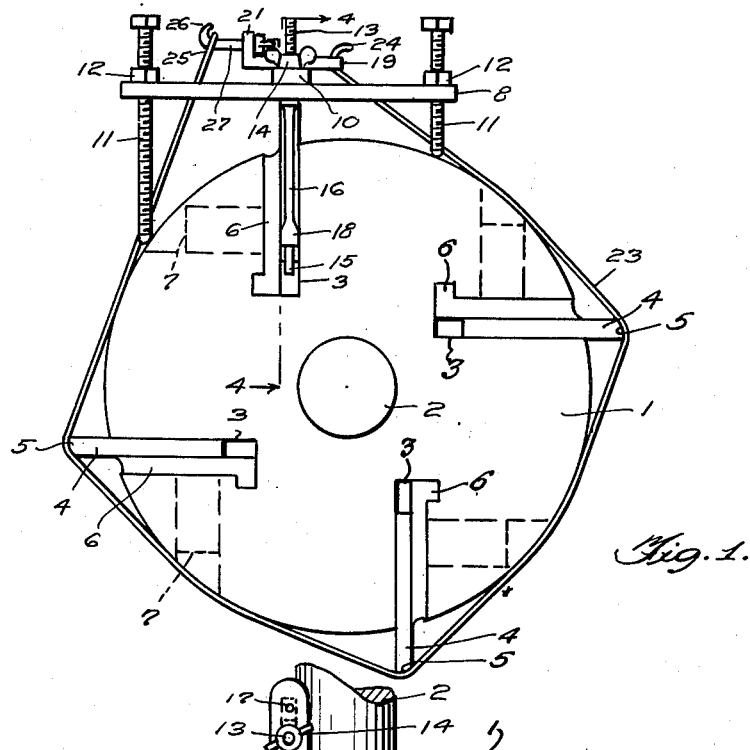
Figure 2:
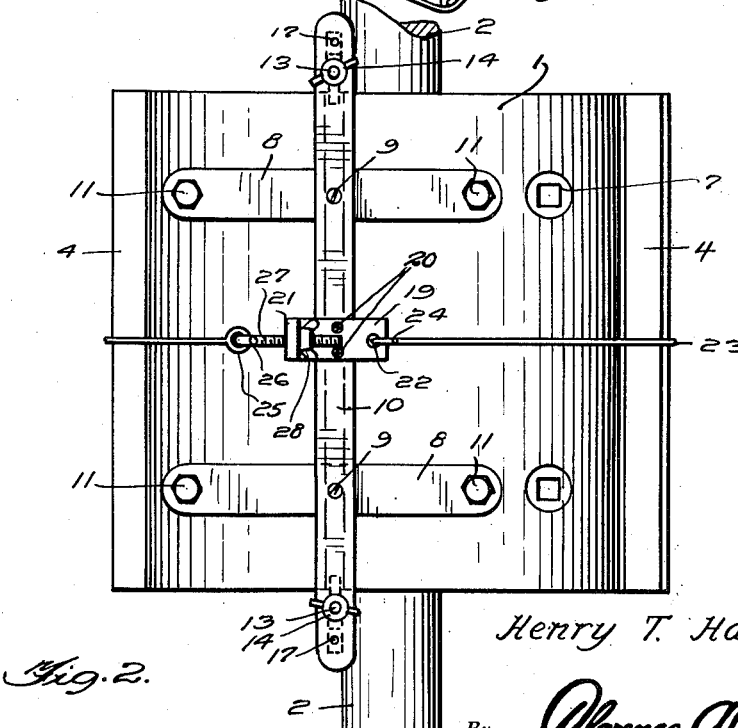

Figure 1 is a view in end elevation of a cutter head having my improved gage applied thereto, Figure 2 is a view in plan of the same, Figure 3 is a view in side elevation, and Figure 4 is a view in vertical, longitudinal section taken on the line 4—4 of Figure 1, and drawn to a larger scale.

Reference being had to the drawings by numerals, my improved gage has been shown therein as especially designed for use on a cylindrical cutter head 1 having end trunnions 2, and non-radial, longitudinal, peripheral slots 3 therein spaced around the same in 90° angular relation and extending from end to end of the head with outwardly adjustable, blade-like knives 4 therein coextensive in length with said slots 3, and the cutting edges 5 of which are designed to extend equidistantly out of said slots. Right angled clamping plates 6 in the slots 3, and set screws 7 in the head 1 for turning against said plates serve to hold the knives 4 in outwardly adjusted position.

The gage comprises a pair of like gage bars 8 of flat form suitably fastened midway of the ends thereof, as by screws 9, to an overlying back bar 10 crosswise of said bar and adjacent to the ends of the bar. Set bolts 11 extend through the ends of the gage bars 8 with lock nuts 12 thereon for turning against said bars. The gage bars 8 are spaced apart a distance less than the length of the head 1, and the set bolts 11 on each gage bar 8 are spaced apart a distance substantially less than the diameter of said head 1, all for a purpose presently seen.

The back bar 10 is longer than the head 1, for a reason presently seen, and is provided with a pair of knife-setting rods 13 slidably and swingably extended through the ends of said bar to depend therefrom and with wing nuts 14 threaded onto the upper ends thereof for engaging the top of said bar. Grapple hooks 15 are provided on one end of said rods 13 for hooking under the ends of the knives 2 and insertion in the ends of the slots 3. Leaf springs 16 removably fixed at one end, as at 17, to the ends of the back bar 10 to depend therefrom alongside said rods 13 and having channeled ends 18 for straddling the lower ends of said rods 13, tend to swing said rods toward each other.

A right angled bridge member 19 fixed, as by screws 20, on top of the back bar 10, crosswise thereof, and midway of the ends of said bar, with an upstanding end 21 thereon and an aperture 22 in the other end thereof, forms part of means for securing the gage on the head 1. The remaining part of the securing means comprises a wire element 23 having a hook 24 on one end for fastening in the aperture 22, and a loop 25 on its other end for fastening over a hook 26 on one end of a wire tightening bolt 27 threaded through the upstanding end 20 of said bridge member 19.

In applying and operating the described gage, the head 1 is operated to revolve a desired knife 4 uppermost thereon in upstanding position. The gage is then positioned on said head 1 with the gage bars 8 extending across the cutting edge 5 of the knife 4 adjacent to opposite ends of the knife, and with said edge 5 centered approximately under the back bar 2 and the ends of said bar 10 extended beyond the ends of the knife equidistantly, the set bolts 11 having been adjusted in predetermined degree to space said gage bars 8 above the head 1 according to the setting of the knife 4 desired. The element 23 is then attached to the bridge member 19 and tightening bolt 27, in the manner already described, the element being trained around the head 1 and across the other knives 4. The tightening bolt 27 is then turned to tighten the element 23 and secure the set bolts 11 in place on the head 1. Now, by turning the wing nuts 14, the knife adjusting rods 13 may be lowered so that the hook ends 15 thereof may be entered in the appropriate slots 3 under the ends of the knife 4. In this connection, the leaf springs 16, in a manner which will be clear, act to swing said rods 13 so that the hook ends 15 of the rods snap into the slots 3 as soon as said ends 15 clear the inner edge of the knife 4. With the knife adjusting rods positioned as described, said rods may be adjusted upwardly by manipulation of the wing nuts 14 to lift the knife 4 up to the gage bars 8, it being understood, of course, that the set screws 7 have previously been loosened to disengage the appropriate clamping plate 6 so that said knife 4 may be lifted in the slot 3. Thus, the outward adjustment of the knife 4 is gaged at each end of the blade so that said knife may be accurately set as desired. By turning the tightening bolt 27 so as to loosen the element 23, and withdrawing the hooked ends 15 of the knife adjusting rods 13 out of the slot 3 the gage may be unfastened, the loop end 25 disconnected from said tightening bolt 27 and the gage applied again to another knife 4 revolved into an uppermost position on the head 1.

Any suitable means, not shown, may be provided on the set bolts 11 and gage bars 8 for predetermining the extent to which the set bolts 11 shall be turned so as to position the gage bars 8 for different settings of the knives 4.

By loosening the screws 9 the bars 8 may be set diagonally of the back bar 10 and fixed in that position by tightening said screws, so that said bars may be set relative to knives disposed diagonally of the head 1. The leaf springs 16 are removable for replacement purposes.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

What I claim is:

A gage for use on a cutter head having a knife adjustable outwardly thereof with exposed ends, said gage comprising a pair of gage bars adapted to extend across said knife adjacent to opposite ends of the same, a back bar extending across the gage bars and rigidly connecting the same together, set bolts threaded through the ends of each gage bar for engagement with said head to variably space the gage bar from the head, a flexible securing element circumscribing said head and fixedly secured to one side of said back bar and adjustably secured to the other side of the same for tightening said element to anchor said back bar to said head with the set bolts engaging said head, said back bar having an aperture at each end thereof, a knife setting rod slidably mounted in each aperture, said rods each having at one end a grapple hook for engaging the end of the knife and at the other end a threaded portion provided with a nut bearing against said back bar to adjust the length of the rod, and spring means for biasing the hooks inwardly.

HENRY T. HACKER.

REFERENCES CITED

The following references are of record in the file of this patent:

UNITED STATES PATENTS

| Number | Name | Date |
| --- | --- | --- |
| 89,394 | Evans | Apr. 27, 1869 |
| 536,103 | Snyder | Mar. 19, 1895 |
| 836,847 | Whitener | Nov. 27, 1906 |
| 846,723 | Blood | Mar. 12, 1907 |
| 1,042,280 | Salmer | Oct. 22, 1912 |
| 1,385,139 | MacDougal | July 19, 1921 |
| 1,629,632 | Nobles | May 24, 1927 |
| 1,641,114 | Carlson | Aug. 30, 1927 |
| 1,668,431 | Sprinkle | May 1, 1928 |

FOREIGN PATENTS

| Number | Country | Date |
| --- | --- | --- |
| 183,380 | Great Britain | July 27, 1922 |
| 429,483 | France | July 19, 1911 |
| 546,579 | France | Aug. 26, 1922 |
| 581,252 | France | Sept. 24, 1924 |